United States Patent [19]

Kawasaki

[11] 4,426,691
[45] Jan. 17, 1984

[54] VOICE WARNING DEVICE WITH REPEAT MECHANISM FOR AN AUTOMOTIVE VEHICLE

[75] Inventor: Teruo Kawasaki, Yokohama, Japan

[73] Assignee: Nissan Motor Company, Limited, Kanagawa, Japan

[21] Appl. No.: 297,198

[22] Filed: Aug. 28, 1981

Related U.S. Application Data

[63] Continuation-in-part of Ser. No. 163,503, Jun. 23, 1980, abandoned.

[30] Foreign Application Priority Data

Jul. 2, 1979 [JP] Japan .................................. 54-82685

[51] Int. Cl.³ .............................................. G08B 19/00
[52] U.S. Cl. ....................................... 369/21; 369/22; 360/12; 340/52 F
[58] Field of Search ............... 369/21, 22, 69; 360/12; 340/692, 54, 52 F, 52 D, 52 R

[56] References Cited

U.S. PATENT DOCUMENTS

| | | | |
|---|---|---|---|
| 3,310,793 | 3/1967 | Fakarabe | 360/12 |
| 3,641,496 | 2/1972 | Slavin | 340/148 |
| 3,662,363 | 5/1972 | Chertok | 360/72.2 |
| 3,804,993 | 4/1974 | Honnold | 360/12 |
| 3,808,591 | 4/1974 | Panicello et al. | 340/27 R |
| 3,870,818 | 3/1975 | Barton et al. | 179/15 M |
| 3,908,085 | 9/1975 | Jagron | 179/15 M |
| 3,909,842 | 9/1975 | Noji | 360/12 |
| 4,310,825 | 1/1982 | Tsunoda | 340/52 F |

FOREIGN PATENT DOCUMENTS

| | | | |
|---|---|---|---|
| 2714621 | 10/1978 | Fed. Rep. of Germany | 360/12 |
| 422009 | 3/1911 | France | 360/12 |
| 2258094 | 8/1975 | France | 360/12 |
| 1420603 | 1/1976 | United Kingdom | 360/12 |

*Primary Examiner*—Alan Faber
*Attorney, Agent, or Firm*—Lowe, King, Price & Becker

[57] ABSTRACT

A voice warning device has a record disc as a recording medium storing warning and a repeat mechanism for repeatedly reproducing the warnings. The record disc contains a plurality of warning messages respectively corresponding to preselected abnormal conditions of vehicle devices. The repeat mechanism includes a means for detecting the most recently reproduced warning.

12 Claims, 11 Drawing Figures

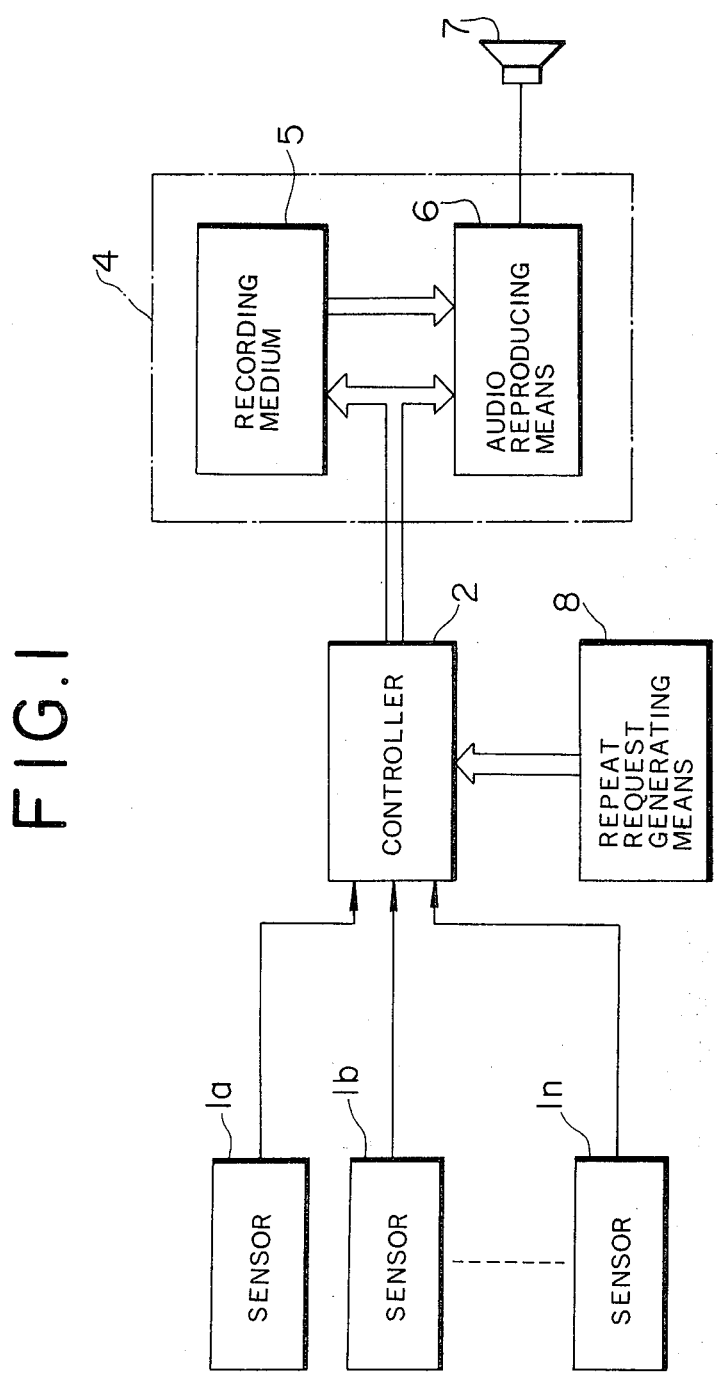

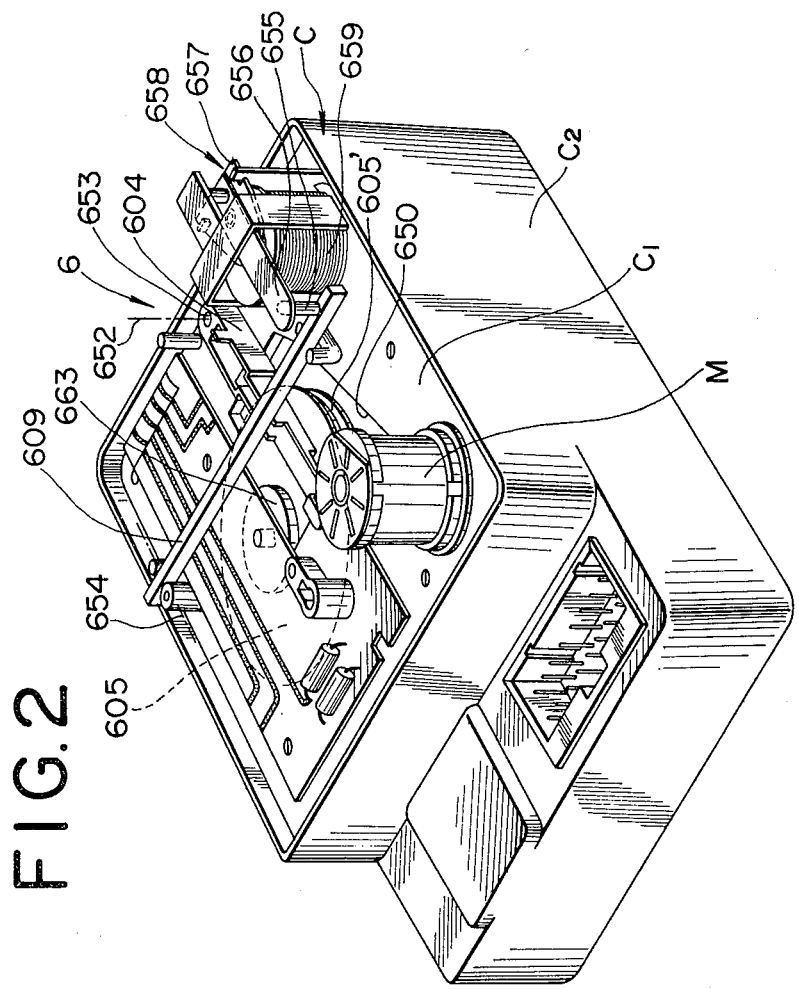

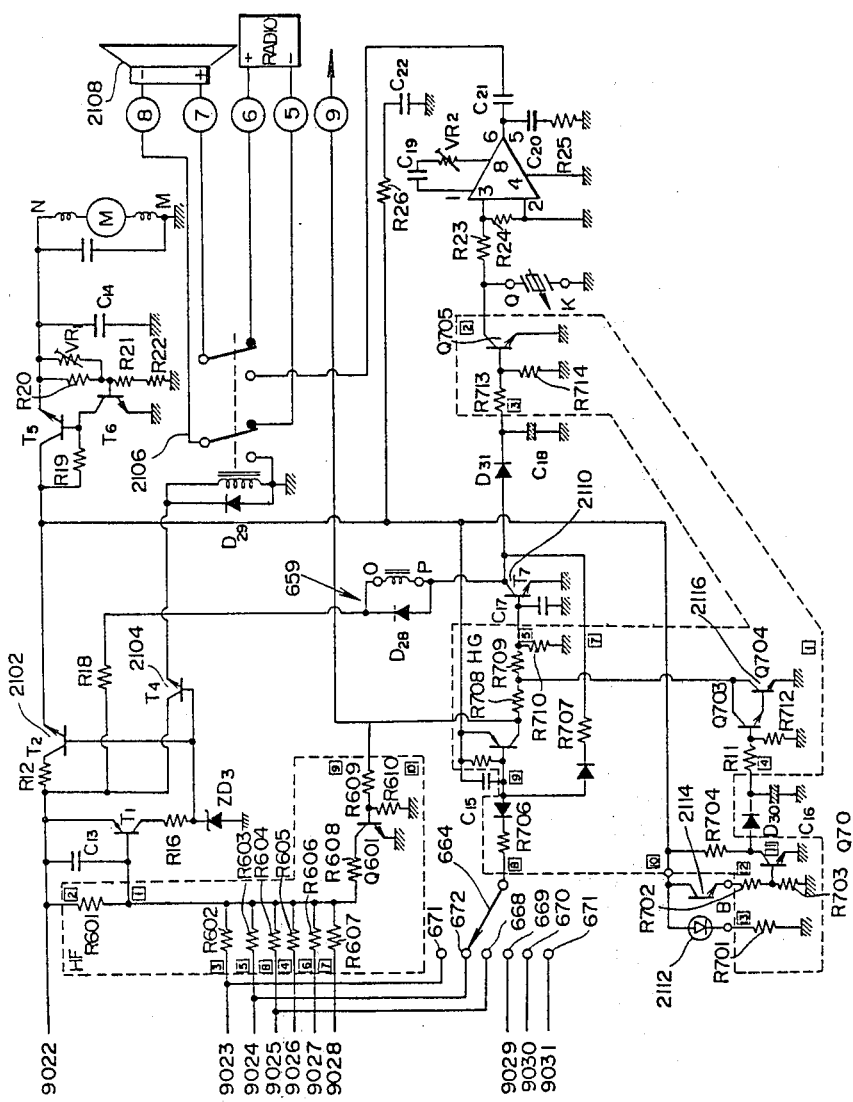

VOICE WARNING DEVICE WITH REPEAT MECHANISM FOR AN AUTOMOTIVE VEHICLE

CROSS-REFERENCE TO THE RELATED APPLICATION

The present application is a continuation-in-part application of Ser. No. 163,503 filed June 23, 1980 entitled "Voice Warning Device for an Automotive Vehicle", which is now abandoned.

BACKGROUND OF THE INVENTION

The present invention relates generally to a device for warning of abnormal or undesirable conditions of an automotive engine or vehicle equipment in the form of human voice announcements which are stored in a recording medium. More specifically, the invention relates to an improvement in the voice warning device so that it permits the passengers to listen to warnings repeatedly when the passenger fails to understand when first reproduced.

In the prior art, there have been developed various device for warning of abnormal or undesirable conditions of the engine or vehicle equipment by vocal recordings in response to sensor signals which are generated when the sensor detects the abnormal or undesirable condition. Typically, states to be monitored are key removal when the driver gets out the vehicle, extinguishing headlights when the ignition key switch is turned off, fuel supply decreasing below a predetermined level, incomplete closing of the passenger doors, and so on. Therefore, the sensors for detecting the condition of key switch, lighting switch, fuel level, and door switch have been provided for the vehicle. Each sensor detects the condition of one state to be monitored and produces a command signal when it detects an unwelcome state to make the reproducing means operative. In order to obtain exact information, it may be preferable to repeat the warning when the passenger fails to understand while the warning is performed the first time.

Conventionally, such voice warning devices having repeat mechanisms have been known. Such devices include a digital processor serving as a voice synthesizer or a tape recorder for storing the voice warning for the preselected items and means for reproducing the warning announcements. However, both the synthesizer system and the tape recorder system are expensive to apply to the vehicle.

SUMMARY OF THE INVENTION

Therefore, it is an object of the present invention to provide a voice warning device for an automotive vehicle which is comparably inexpensive and can reproduce relatively high-quality sound.

Another object of the present invention is to provide a voice warning device which has a record disc as recording medium and a repeat mechanism for repeatedly reproducing the warning, the record disc containing a plurality of warnings respectively corresponding to preselected unwelcome conditions of the vehicle devices, and the repeat mechanism including a means for detecting the most recently reproduced.

To accomplish the above-mentioned and other objects, there is provided a voice warning device with a repeat mechanism, which comprises first means for detecting the abnormal or undesirable condition of the vehicle devices or equipment and for producing a first signal indicative of the abnormal or undesirable condition of the vehicle devices or equipment, second means for reproducing a plurality of voice warning messages, the second means including a record disc for prerecording the voice warning messages respectively corresponding to abnormal or undesirable conditions of the vehicle devices or equipment to be detected by the first means, a record player for reproducing at least one of the voice warning messages corresponding to the vehicle device or equipment in which is detected the abnormal or undesirable condition corresponding to the first signal, means for identifying one of the voice warning messages corresponding to the inputted first signal, third means being manually operative to produce a second signal, and fourth means for controlling the second means and responsive to the second signal to repeatedly reproduce the voice warning message which was last reproduced.

According to a further specific embodiment, the voice warning device for an automotive vehicle comprises detecting means for checking various check points in the vehicle for detecting abnormal conditions of respective checking points, the checking means producing a first signal when it detects an abnormal condition of one of the checking points, a record disc containing a plurality of voice warning messages on respective tracks thereof, a record player including a pickup for playing back the recorded warning messages from the tracks, an actuation means for driving the record disc to turn and putting the pickup onto one of the tracks in response to the first signal and an initializing means for returning the pickup to the initial position thereof wherein the pickup is located at the starting point of each of the tracks and separated from the record disc, a switch member responsive to the first signal for activating the actuation means for driving the record player for reproducing one of warning messages identified by the first signal, a stop means for stopping record player operation after expiration of a predetermined duration of the reproduction of the warning message and a resetting means for resetting the stopping means for returning the record player to the state adapted to reproduce the warning message which was reproduced in the immediately preceding device operation.

BRIEF DESCRIPTION OF THE DRAWINGS

The present invention will be more fully understood from the detailed description give herebelow and from the accompanying drawings of the preferred embodiment of the present invention, which, however, should not be taken as limitative to the present invention but for elucidation and explanation only.

In the drawings:

FIG. 1 is a block diagram showing a general constructon of a preferred embodiment of a voice warning device according to the present invention;

FIG. 2 is an perspective view of a preferred embodiment of a record player with a record disc, which is used in the voice warning device of FIG. 1;

FIGS. 9-1, 9-2 and 9-3 is a circuit diagram showing the detailed circuit construction of the record player circuit according to the preferred embodiment of the present invention.

DESCRIPTION OF THE PREFERRED EMBODIMENT

Figures 1, 9:
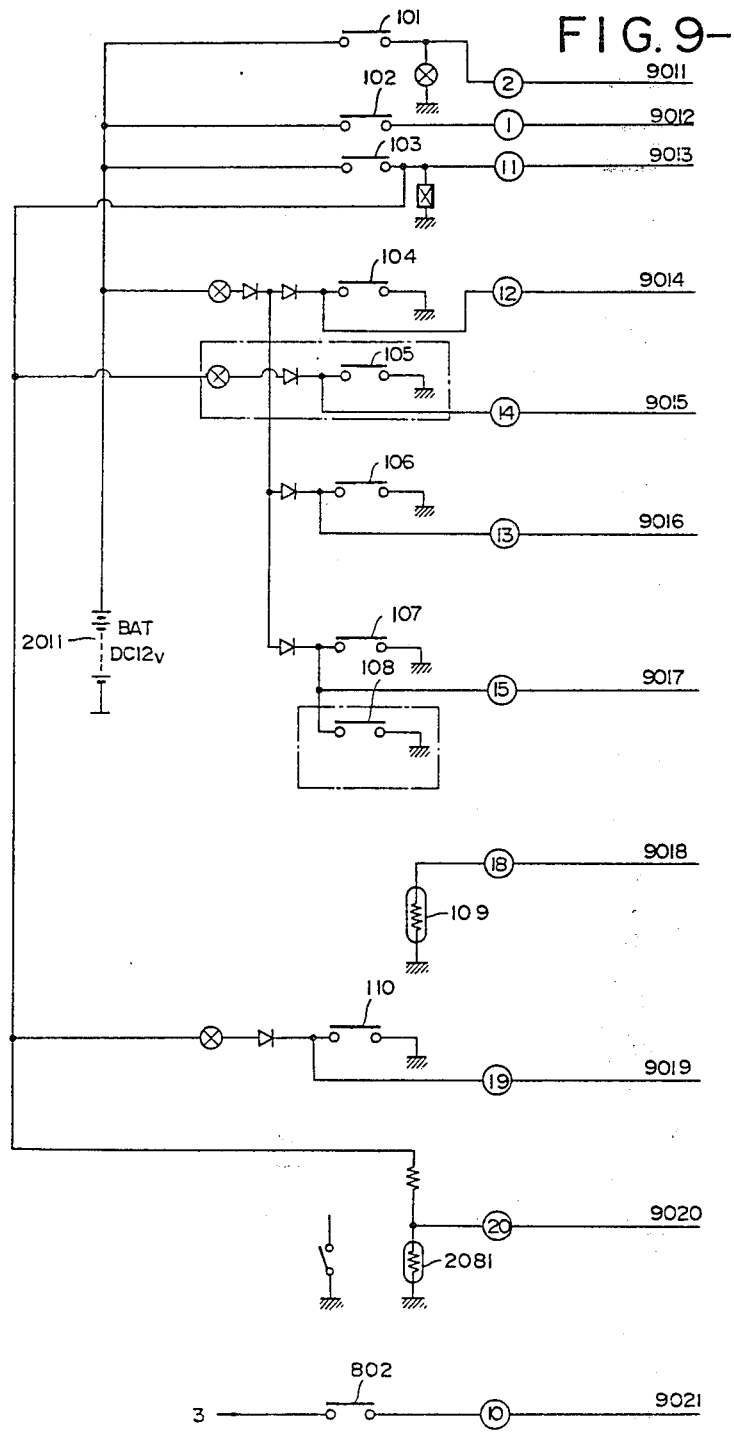

Referring now to the drawings, particularly to FIG. 1, the general construction of a preferred embodiment of the present invention is illustrated. In the preferred embodiment, the voice warning device is adapted to react to the conditions of leaving the vehicle door ajar, driving the vehicle while applying the parking brake, maintaining the lighting switch on when the key is removed, leaving the key in the key cylinder when leaving the vehicle, and fuel amount being less than a predetermined value. However, when the description given herebelow refers to warning about the foregoing items, it should be appreciated that any items about which to be warned can be selected and therefore the current invention is not to be limited to the specified items.

A plurality of sensors $1a$, $1b$ ... $1n$ are adapted to detect undesirable or abnormal conditions of the check points corresponding to the warning items as set forth. Each sensor 1 generates a sensor signal when it detects an abnormal or undesirable condition of the check point corresponding to the warning item. The sensor signal is fed to a controller 2 which controls totally the voice warning devices. Corresponding to the sensor signal inputted, the controller 2 determines or identifies warning item to be warned and produces a command for operating a voice warning reproducing means 4. The voice warning reproducing means 4 comprises a record medium 5 and audio reproducing means 6. In the preferred embodiment, the record medium is a record disc having plural tracks respectively recording the warning corresponding to each of the warning items. For reproducing the warning recorded in the record disc, a record player is used as the audio reproducing means 6 in the preferred embodiment.

A repeat request generating means 8 is connected to the controller 2. The repeat request generating means is manually operable to generate a repeat request signal. The repeat request signal is fed to the controller to make the latter operative to produce the same warning as was most recent reproduced. Therefore, when the passenger fails to understand the first warning or desires to listen to the warning again, the manual switch for operating the repeat request generating means 8 is operated. In response to the operation of the manual switch, the repeat request signal is generated to operate the controller 2 again.

Now, before going into the detailed description of the voice warning device according to the preferred embodiment of the present invention, I shall explain the fundamental function of the preferred embodiment. For warning about the leaving of the vehicle door ajar (hereafter referred to as "ajar a warning"), door limit switch and vehicle speed sensor are checked. When the door limit switch, which is usually used for lighting the roof lamp in the vehicle compartment while the door is open, is turned on and the vehicle speed sensor detects that the vehicle speed is more than zero, the controller recognizes the condition for ajar warning. For warning about application of parking brake (hereafter referred to as "brake warning"), a parking brake switch and the vehicle speed sensor are checked. When the parking brake is on and the vehicle speed sensor detects non-zero vehicle speed, the brake warning is effected. For warning about lighting when the key is removed from the key cylinder (hereafter referred to as "lighting warning"), a lighting switch and a key switch, e.g. main switch, are checked. If the lighting switch is on and the key switch is turned off, the controller 2 detects the lighting switch condition about which to warn and operates the audio reproducing means 6 to reproduce the lighting warning. For effecting warning about leaving the key in the key cylinder when the driver opens the vehicle door, hereafter referred to as "key warning", the ignition switch and the door switch of the door next to the driver's seat are checked. For warning about the fuel supply being less than the predetermined amount, fuel level sensor is checked. In case of warning for the fuel amount (hereafter referred as "fuel warning"), it may repeated twice and then stopped. For other items of warning, warning will be reproduced repeatedly until the foregoing check points respectively corresponding to the warning items are returned to the normal states.

In the operation of the device shown in FIG. 1, each of the sensor or switch outputs is fed to the controller 2. The controller 2 determines which item is to be warned about in response to the input thereto. The controller 2 generates a command according to the determined warning item and feeds the command to the audio reproducing means 6 to operate the same. The audio reproducing means 6 includes means for scanning the recorded warnings to select one of them according to the input fed from the controller 2. The scanning means detects the item to be reproduced and produces an audible signal corresponding to the warning item represented by the command. If the warning item reproduced is the fuel supply warning, the warning is stopped after repeating the warning twice. If the passenger wishes to listen to the warning again, the manually operable repeat switch can be operated. In response to operation of the repeat switch, the repeat request generating means 8 produce the repeat request signal for operating the controller 2. In this condition, the controller 2 detects the presence of the item to be warned about again and operates the audio reproducing means 6 again.

Now, referring to FIGS. 2 to 6, there is illustrated a preferred embodiment of the audio reproducing means 6. A casing C of the record player as the audio reproducing means 6 comprises a chassis $C_1$ and a housing $C_2$. On the chassis $C_1$ there is provided a motor M, a tone arm 604, a swingable arm 609 for moving the tone arm 604 toward and away from a record disc 605 acting as the record medium, and a resistor-type speed controller 610. A part of the upper plate of chassis $C_1$ is cut away in an area surrounding the pickup 603 of the tone arm 604 to define an opening passage 650 for the stylus.

The tone arm 604 has a through opening 651 at the end remote from the pick up. The tone arm 604 pivots about an axis 652 by engagement of the through opening 651 with a pivot 653 protruding through the upper plate of the chassis C₁. Thus, the tone arm 604 is pivotably attached at one end thereof on the upper plate of the chassis C₁ and is capable of being swingably moved in both horizontal and vertical directions within the area defined by the cut away. The tone arm 604 is resiliently urged by a helical return spring 604' toward its initial or starting position of sound reproduction, constantly.

Figure 3:
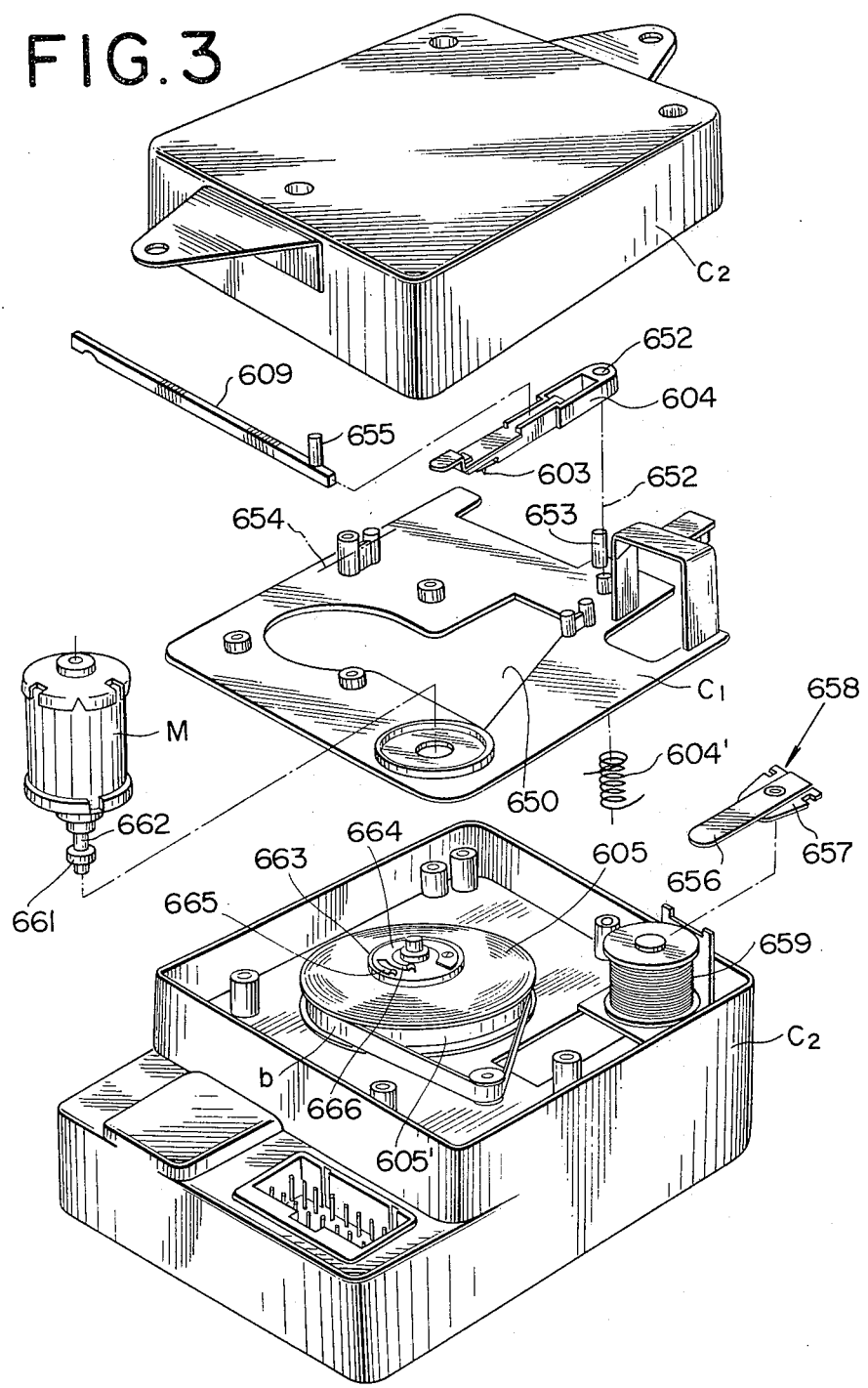
FIG. 3 is an exploded view of the record player of FIG. 2.
Figure 4:
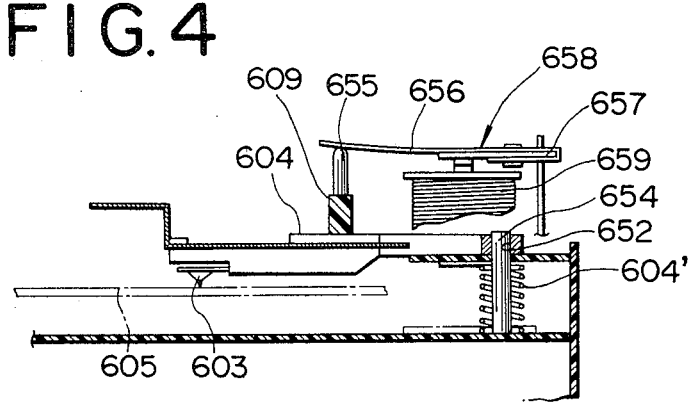
FIG. 4 is a fragmentary cross-sectional view of an actuator for the pick up in the record player of FIG. 2.
Figures 2, 9:
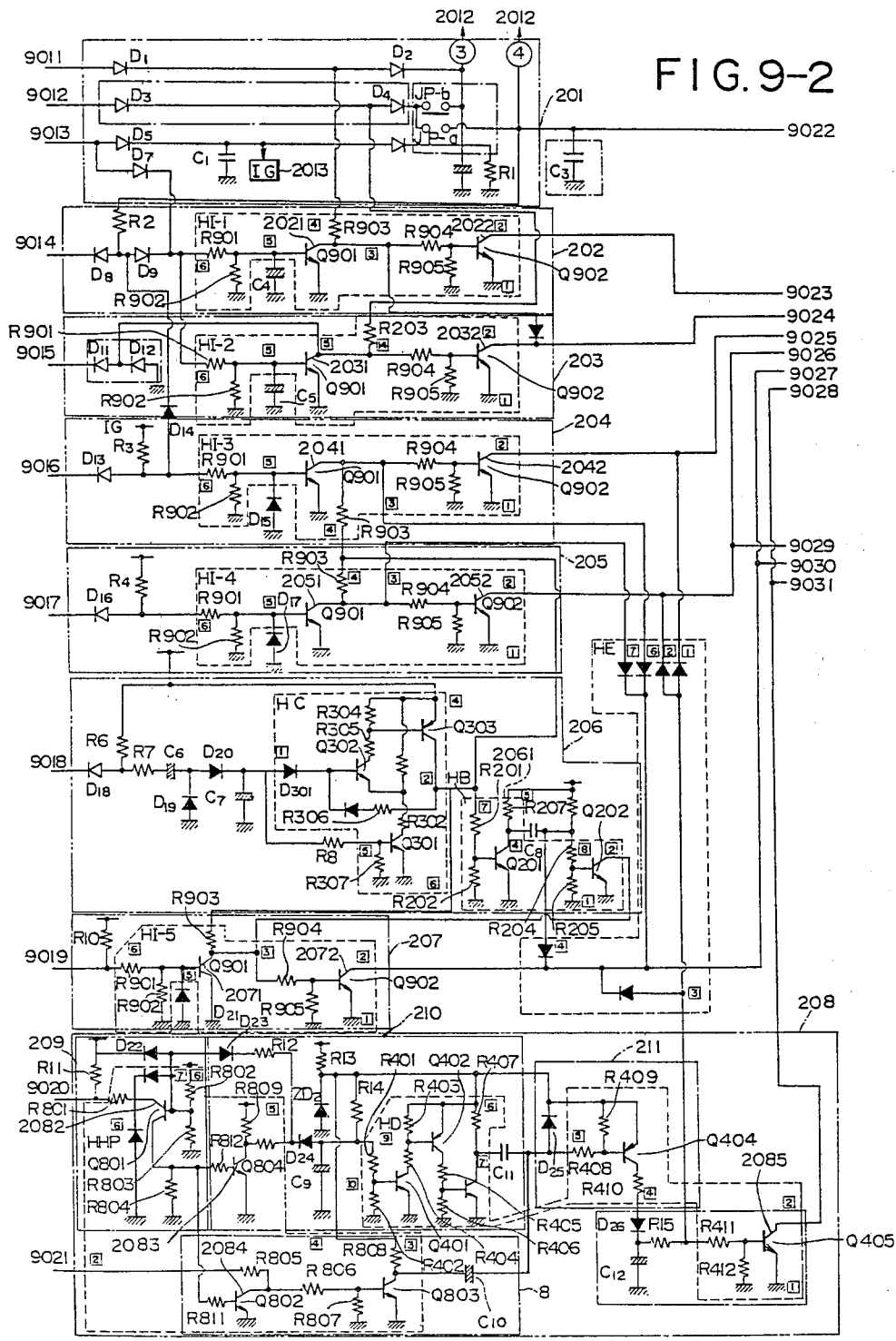

The swingable arm 609 is attached to chassis C in order to pivot about a horizontal axis 654, and thus is capable of moving in both the horizontal and vertical directions. The swingable arm 609 crosses over the tone arm 604 at a position near the free end thereof. As shown in FIGS. 2 and 3, the swingable arm 609 is provided with an upward projection 655 at the free end thereof. The projection 655 faces a leaf spring 656 biased normally away from the projection. The leaf spring 656 is attached to a metal support 657 to constitute an actuator spring assembly 658. The actuator spring assembly 658 is positioned near an electromagnetic actuator 659 such as a solenoid.

Figure 5:
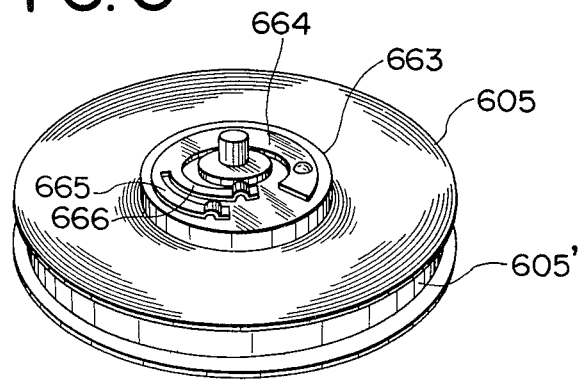
FIG. 5 is a perspective view of the record disc attached to a turntable.
Figure 6:
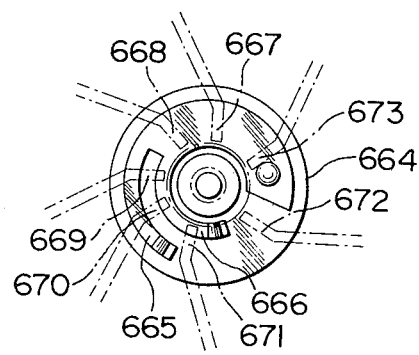
FIG. 6 is a plane view of movable contacts arranged opposite a plurality of stationary contacts which are shown by phantom lines.

As shown in FIGS. 2, 3 and 5, the record disc 605 is integral with a turntable 605' which is driven by the motor M through a belt b stretched between the groove 660 which is formed on the circumference of the turntable 605' and a drive pulley 661 attached on the drive shaft 662 of the motor M. The turntable 605' has a circular projection 663 extending upwards from the upper surface thereof. A switch member 664 having a pair of contactor sections 665 and 666 respectively is attached onto the upper plane surface of the circular projection 663. Each of the free ends of the contactor sections 665 and 666 is bent upwards for instituting contact. The switch member 664 rotates with the turntable 605' in synchronism with the rotation of the record disk 605. Opposing the contactor sections 665 and 666, there is provided a plurality of stationary terminals 667, 668, 669, 670, 671, 672 and 673, to which the contacts of the contactor sections 665 and 666 are slidingly urged. The contact of the contactor section 665 is constantly in contact with the annular stationary terminal and the contact of the contactor section 666 slides across the stationary terminals 668 to 673 according to the rotation of the turntable 605'. The switch member 664 is electrically connected with the actuator 659 for controlling operation of the actuator.

The stationary terminal 667 is connected with a power source (not shown) and remaining terminals 668 to 673 are connected to the controller 2 and corresponded to respective warning items. Each stationary terminal 668 to 673 is located so as to contact the contact of the contactor section 666 when a starting point or guide groove of the record disc 605 corresponding to the warning item to be reproduced opposes the pickup 603 of the tone arm 604. The grooves formed on the record disc 605 are helical and store therealong one warning per revolution.

In the shown embodiment, the stationary terminal 668 is adapted for the right-side door ajar warning. The stationary terminal 669 is adapted for the left-side door ajar warning. The stationary terminal 670 is adapted for the brake warning. The stationary terminal 671 is adapted for the lighting warning. The stationary terminal 672 is adapted for the key warning. And, the stationary 673 is adapted for the fuel warning. The controller 2 outputs a command when it detects one of warning item to be announced. When the contact of the contactor section 666 contacts the stationary terminal to which the controller output is inputted, the electric power is supplied through the circuit closed by connecting the contact of the contactor section 666 and the stationary terminal to activate the actuator 659. In response to being supplied with power, the actuator 659 pulls the actuator spring assembly 658 downwards. At this time, the projection 655 is pressed downwards to force the tone arm 604 down. Thus, the pickup 603 of the tone arm 604 is placed at the starting point of the warning recorded in the track.

Although not clearly shown, a record end detector is provided at a portion corresponding to the end of the tone arm motion. In the preferred embodiment, the record end detector comprises a photo emitting member and a photo-sensitive member arranged opposite to one another. The photo-emitting member normally transmits a light to the photo-sensitive member. When the tone arm 604 reaches the end of its motion which corresponds to the end of the record grooves, the tone arm 604 interrupts the light of the photo emitting member. The photo-sensitive member becomes operative to deactivate the actuator 659. Therefore, the tone arm 604 becomes free from a force urging the same toward the record disc 605 and is permitted to return the initial position thereof with a force of the return spring 604'. By the return motion of the tone arm, the light transmitted from the photo-emitting member reaches to the photo-sensitive member to make the later inoperative. At this position, the actuator is again activated to repeat reproducing of the warning message corresponding to the sensor signal.

Therefore, the warning message is repeated until the check point corresponding to the warning message is returned to the normal position.

Figure 7:
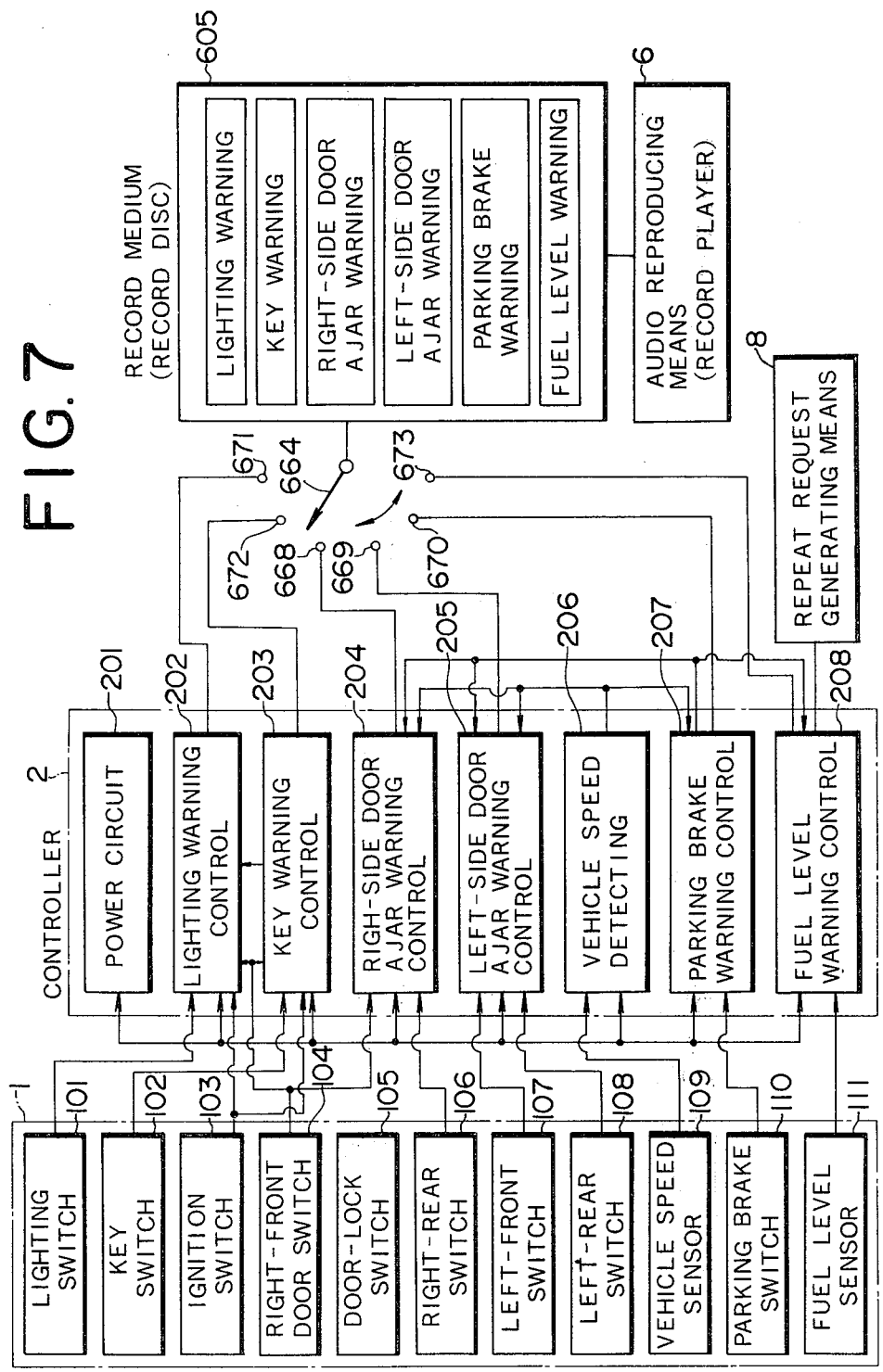
FIG. 7 is a block diagram of an electric circuit of the record player which includes the repeat circuit for operating the repeat mechanism.

Referring to FIG. 7, there is illustrated a preferred construction of the circuit construction of the voice warning device of the present invention, in the form of a block diagram. For detecting conditions of each of checking points, there are provided a plurality of sensors and switches. A lighting switch 101 is connected to the controller for supplying an output while the lighting switch 101 is turned on. A key switch 102 remains on while the key (not shown) is maintained in the key cylinder (not shown). Ignition switch 103 outputs a signal while it is kept in the "on" position. Limit-switches 104 to 107 respectively are adapted to detect right-side front door, right-side rear door, left-side front door and left-side rear door opening, and are referred to respectively as "right-front door switch", "right-rear door switch", "left-front door switch" and "left-rear door switch". Also, door lock switch 108 is provided for detecting the locking of the door beside the driver's seat, and is hereafter referred to as the "door-lock switch". A vehicle speed sensor 109 is also connected with the controller 2 for inputting thereto a sensor signal. A parking brake switch 110 is turned on when the parking brake is applied. The parking brake switch 110 is adapted for turning on the brake lamp in a per se well known manner and for forwarding the output to the controller 2. A fuel level detector 111 detects when the fuel level is lower than a predetermined level to produce an output.

The controller 2 includes a power circuit 201 including a main switch of the voice warning device. Also, the controller 2 includes a lighting warning control circuit 202, key warning control circuit 203, right-side door ajar warning control circuit 204, left-side door ajar warning control circuit 205, vehicle speed detecting circuit 206, parking brake warning control circuit 207 and fuel level warning control circuit 208. Each of control circuits 202, 203, 204, 205, 207 and 208 is connected to a stationary terminal 668 to 673.

Figure 8:
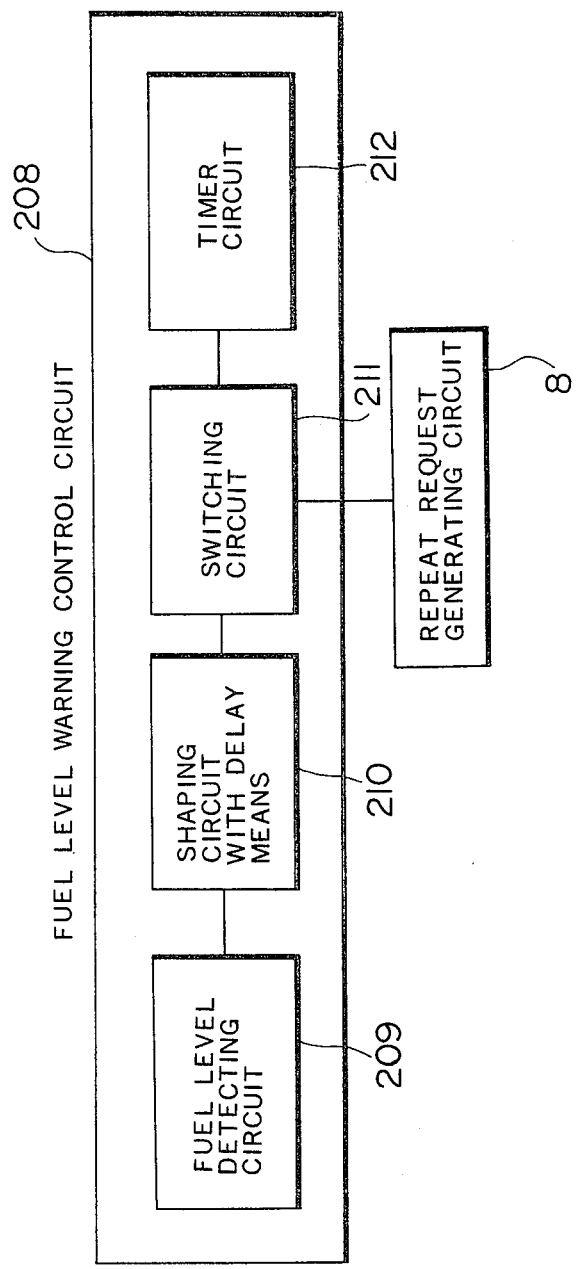
FIG. 8 is a block diagram of the fuel level warning control circuit of FIG. 7

As illustrated in detail in FIG. 8, the fuel level warning control circuit 208 includes a detecting circuit 209, a shaping circuit 210 including a delay circuit, a switch circuit 212 and a timer circuit 213. In the preferred construction, the timer circuit 213 is adapted to repeat the fuel level warning twice when the fuel level becomes lower than the predetermined level. A repeat request generating means 8 is connected to the switch circuit 212 for turning on the switching circuit 212 which is turned off when the preset time in the timer circuit 213 expires. As stated above, the remaining warnings are repeated until the check point detector corresponding to the reproduced warning is returned to the normal condition. If the driver wants to maintain the condition of the check point without correcting the condition, the main switch in the power circuit can be turned off to reset the warning.

Hereafter, the function of the voice warning device according to the preferred embodiment will be described with reference to foregoing FIGS. 7 and 8. By turning on the main switch in the power circuit 201, the voice warning device becomes operative. If the lighting switch 101 is maintained in an on position when the driver leaves the vehicle, a lighting warning is effected. For detecting the condition appropriate to the lighting warning, the lighting warning control circuit 202 receives outputs from the lighting switch 101, ignition switch 103 and right-front door switch 104. It should be appreciated that the door switch to be connected to the lighting warning control circuit 202 is the limit switch detecting opening of the door beside the driver's seat. Therefore, if the driver's seat is on the left side of the vehicle compartment, the left-front door switch 106 is to be connected to the lighting warning control circuit 202. If the lighting switch 101 is kept in the "on" position, and the ignition switch 103 is turned off and the right-front door switch 104 is on, the lighting warning control circuit 202 becomes operative to produce the output. The output of the lighting warning control circuit is fed to the stationary terminal 671. When the contact of the contactor section 666 contacts the terminal 671 and thus establishes a closed circuit, the actuator 659 is supplied with electric power to be activated. By actuation of the actuator, the actuator spring assembly 658 is biased downwards to place the pickup 603 of the tone arm 604 on the starting point of the record groove containing the lighting warning. The lighting warning picked up by the pickup 603 is fed to a speaker through an amplifier, which constitutes a reproducing device, in a per se known manner.

The key warning control circuit 203 is connected to the key switch 102, the ignition switch 103 and the right-front door switch 104. If the key switch is on and the ignition switch is off, the key warning control circuit 203 is responsive to the right-front door switch 104 output for producing an output. The output of the key warning control circuit 203 is fed to the stationary terminal 672. Similar to the foregoing lighting warning, the pickup 603 of the tone arm 604 is then placed on the record groove containing the key warning to reproduce the pre-recorded warning.

The right-side door ajar warning circuit 204 is connected with the right-front door switch 104, the right-rear door switch 105, and vehicle speed detecting circuit 206 to which the vehicle speed sensor signal is inputted. Also, the right-side door ajar warning control circuit 204 is connected to a park brake switch 110. The right-side door ajar warning control circuit 204 becomes operative when either one or both of the right-front and/or right-rear door switches are on, the ignition switch is off and the vehicle speed detecting means outputs a signal representative of some vehicle speed other than zero. Here, if the parking brake switch 110 is on, the right-side door ajar warning control circuit 204 remains inoperative. If the parking brake switch is off, the right-side door ajar warning control circuit 204 outputs a signal to the stationary terminal 668. Similarly, the left-side door ajar warning control circuit 205 is connected to the left-front and left-rear door switches 106 and 107, the ignition switch 103, vehicle speed detecting circuit 206, and the parking brake switch 110. The left-side door ajar warning circuit 205 is operative under the condition that either one or both of the left-front and left-rear door switches 106 and 107 are on, the ignition switch 103 is off, the parking brake switch 110 is off, and the vehicle speed detecting circuit 206 outputs a vehicle speed signal representative of a vehicle speed other than zero.

The parking brake warning control circuit 207 is connected with the park brake switch 110 and the vehicle speed detecting circuit 206. When the parking brake is applied and then the vehicle is driven, the condition is adapted to reproduce the parking brake warning. Therefore, the parking brake warning control circuit 207 becomes operative when the parking brake switch 110 is on and the vehicle speed detecting circuit 206 outputs a vehicle speed signal. It will be appreciated from the foregoing description that the parking brake warning is given higher priority than the door ajar warnings. Therefore, of the two factors, to be warned about, i.e., door ajar or application of parking brake, the park brake warning will be effected prior to the door ajar warning.

The fuel level warning circuit 208 is connected with the fuel level detector 111. The output of the fuel level detector 111 is inputted to the detecting circuit 209. The detecting circuit 209 outputs a signal when it detects that the fuel level is lower than the predetermined level. For preventing the warning device from causing erroneous warning due to sloshing of the fuel in the fuel tank, the delay circuit 210 provides for a predetermined time lag before supplying the detecting circuit output to the switching circuit 211. If the detecting circuit output resets before expiration of the time lag set in the delay circuit 210, the fuel level warning control circuit 208 may not output the signal for operating the actuator for fuel level warning. When the set time lag expires and the detecting circuit output remains, the switching circuit 210 becomes operative to output a signal to the stationary terminal 673. At the same time, the timer circuit 211 becomes operative to measure the time during which the switching circuit 210 is operative. In the preferred embodiment, the time set in the timer circuit 211 is adapted to effect the fuel warning twice. When the time set in the timer circuit 211 is expired, the switching circuit is deactivated to stop reproduction of the fuel level warning.

If the passenger in the vehicle wishes to listen to the immediately preceding warning again, the manually-operable repeat switch can be operated. The repeat request generating means 8 is responsive to actuation of the repeat switch for producing the repeat request signal. The repeat request signal is fed to the switching circuit 210 of the fuel level warning circuit 208 for activating the switch circuit 210. The switching circuit 210 activates the actuator 659 to put the pickup 603 of the tone arm 604 on the record groove of the record disk 605 containing the fuel level warning. At the same time, the timer circuit starts measuring the time during which the switching circuit 210 is operative. After the predetermined duration, the timer circuit 211 makes the switching circuit 210 inoperative to stop reproduction of the fuel level warning. Similarly to the foregoing, the fuel level warning effected in response to the repeat request signal is repeated twice.

It should be noted that, as stated above, the warnings to be announced are not limited to the described items and also the repeat request generating means 8 can be connected to the any of the warning control circuits in order to repeat those warnings. For example, battery voltage, coolant level and etc. can be added or replaced for some of the shown items.

Now, referring to FIGS. 9-1, 9-2 and 9-3, there is shown a circuit diagram of the electric circuit of the voice warning device, which is shown in FIGS. 7 and 8 in the form of a block diagram. In this Figure, the blocks identified in blocks in FIGS. 7 and 8 are surrounded by chain lines for showing the detailed construction thereof. The power circuit 201 in the controller 2 is connected with a vehicle battery 2011 via the ignition switch 103 serving as main power switch. A main switch 2012 is provided in the power circuit 201 for switching the voice warning device between operative and inoperative states. The power circuit 201 is also connected to the lighting switch 101 and key switch 102. Electric power is supplied to the spark ignition system 2013 which is illustrated in block form in FIG. 9 via the power control circuit 201 and via a diode $D_5$. The lighting switch 101 and the key switch 102 are respectively connected with the lighting warning control circuit 202 and the key warning control circuit 203. The lighting switch 101 is connected to the base electrode of a switch transistor 2022. The ignition switch 103 is connected to the base electrode of a switching transistor 2021. The key switch is connected to the base electrode of a switching transistor 2031 of the key warning control circuit 203, of which, in turn, the collector electrode is connected to the base electrode of a switching transistor 2032.

The base electrode of the switching transistor 2021 is also connected to the right-front door switch 104, which is replaced with the left-front door switch in case where the driver's seat is located on the left side of the vehicle compartment. The switching transistor 2021 is in turn connected to the base electrode of the switching transistor 2022 via its collector electrode. The switching transistor 2021 remains on while either the ignition switch is kept on or the right-front door switch is off, or both. The switching transistor 2021 is turned off when the potential of the base electrode thereof becomes low by turning off the ignition switch 103 and turning on of the right-front door switch 104. In response to turning off the switching transistor 2021, high level voltage is applied to the base electrode of the switching transistor 2022 in response to the lighting switch 101 being closed. Thus, the switching transistor 222 produces a low level output at the collector electrode thereof to be supplied to the stationary terminal 671.

At this time, since the base electrode of the switching transistor 2022 is connected to the collector electrode of the switching transistor 2032, if the switching transistor 2032 is turned on, the switching transistor 2022 is turned off. Thereby, the low output of the switching transistor 2022 is not supplied to the stationary terminal 671. This gives higher priority to the key warning in relation to the lighting warning.

The collector electrode of the switching transistor 2031 of the key warning control circuit 203 is also connected to the door lock switch 105. Also, the ignition switch 103 is connected to the base electrode of the switching transistor 2031. Therefore, when the ignition switch 103 is turned off and the door lock switch 108 is also turned off, the switching transistor 2031 is inactivated. In this condition, if the key is maintained in the key cylinder and therefore the key switch 102 is kept on, high potential is applied to the base electrode of the switching transistor 2032. Here, if the right-front door switch 104 is turned on and thus the high potential is also applied to the collector electrode of switching transistor 2032, the switching transistor 2032 outputs a high level output to be fed to the stationary terminal 672.

The right-side door ajar warning control circuit 204 is connected to the right-front and right-rear door switches 104 and 106. The right-front and right-rear door switches 104 and 106 are connected respectively to the base electrode of a switching transistor 2041 via diodes $D_{11}$ and $D_{13}$. Likewise, the left-front and left-rear door switches 106 and 107 are respectively connected to the base electrode of a switching transistor 2051 of the left-side door ajar warning control circuit 205. Each of the collector electrodes of the switching transistors 2041 and 2051 is connected to an amplifier 2061 in the vehicle speed detecting circuit 206. The base electrodes of the switching transistors 2042 and 2052 are further connected with the collector electrode of a switching transistor 2071 in the parking brake warning control circuit 207.

If either one or both of the right-front or right-rear door switches 104 and 105 are turned on, the switching transistor 2041 is cut off. At this time, if the vehicle speed becomes more than zero or more than a predetermined value, e.g. 8 km/h, the amplifier 2061 outputs an output to be fed to the base electrode of the switching transistor 2042. Since, the switching transistor 2041 is cut off, the output of the amplifier 2061 is applied to the base electrode of the transistor 2042 to turn on the same. The output of the transistor 2042 on the collector electrode thereof is fed to the stationary terminal 668. Likewise, if the either one of or both of the left-front or left-rear door switches 106 and 107 are turned on, the switching transistor 2051 is cut off. Therefore, the output of the amplifier 2061 is applied to the base electrode of the transistor 2052 to turn on the same, when the detected vehicle speed is more than zero or the predetermined speed. The output of the switching transistor 2052 on the collector electrode thereof is fed to the stationary terminal 669.

Here, since the base electrodes of the switching transistors 2042 and 2052 are respectively connected to the collector electrode of the switching transistor 2071 of the parking brake warning control circuit, they are cut off in response to turning off of the switching transistor 2071 by turning on of the park brake switch 110. Therefore, while the parking brake switch 110 is maintained in an on position, the right-side door ajar warning control circuit 204 and the left-side door ajar warning control circuit 205 are kept inoperative.

Likewise to the foregoing door ajar warning control circuits, the collector electrode of the switching transistor 2071 of the park brake warning control circuit 207 is connected with the amplifier 2061 of the vehicle speed detecting circuit 206. In turn, the collector electrode of the transistor 2071 is connected to the base electrode of a switching transistor 2072 which is connected to the amplifier 2061 on the collector electrode thereof. When the park brake is applied, the parking brake switch 110 is turned on to apply a charge to the base electrode of the switching transistor 2071. Here, if the vehicle is driven at a higher speed than a predetermined, the output of the amplifier 2061 is applied to the collector electrode of the switching transistor 2071 to turn off the same. At the same time, by turning off of the switching transistor 2071, the base electrode of the switching transistor 2072 does not receive an output from the switching transistor 2071. On the other hand, the output of the amplifier 2061 is applied to the collector electrode of the switching transistor 2072 to generate a bias voltage thereon. The output of the switching transistor 2072 is fed to the stationary terminal 670.

In the preferred construction, the fuel level is detected by a thermister-type fuel level detector 2081. The fuel level detector 2081 is connected to the collector electrode of a transistor 2082. The emitter electrode of the transistor 2082 is in turn connected with the base electrode of a switching transistor 2083. Also, the emitter electrode of the transistor 2082 is connected to the base electrode of a switching transistor 801 of the repeat request generating means 8. The transistor 2082 acts as a comparator for distinguishing whether the output of the fuel level detector 2081 is larger than a predetermined value. For setting the predetermined value, electric charge supplied from the power source, i.e. vehicle battery, is divided by resistors $R_{802}$ and $R_{803}$. Therefore, the resistance value of the resistors are determined corresponding to the desired set value as a reference value to be compared with the fuel level detector output. The transistor 2082 is turned on when the detected fuel level is lower than the predetermined level and thus the detector output is smaller than the set value. The switching transistors 2083 and 801 are turned off by supplying the power through the emitter electrode of the transistor 2082. For preventing from error in detection of the fuel level lower than the predetermined level, a capacitor $C_9$ is provided between the fuel level detecting circuit 209 and the shaping circuit 210. The capacitor $C_9$ serves for providing a predetermined time delay prior to turning on of the transistor 2082. The shaping circuit 209 also includes a capacitor $C_{11}$ acting as a delay timer. After expiration of the set delay times in the capacitors $C_9$ and $C_{11}$, a switching transistor 2084 in the switching circuit 210 turns off to turn on a switching transistor 2085. By turning on of the switching transistor 2085, the potential is applied to the stationary terminal 673. Here, the duration in which the switching transistor 2085 is turned on is defined by the capacitance of a capacitor $C_{12}$. In the shown embodiment, the capacity of the capacitor $C_{12}$, is adapted for reproducing the fuel level warning twice.

The repeat switch 802 is operated to reproduce the most recently reproduced warning. In response to turning on of the repeat switch 802, a switching transistor 803 grounds the charged potential in the capacitor $C_{12}$. Therefore, during the time while the capacitor $C_{12}$ is fully charged, the switching transistor 2085 causes the fuel level warning to be operated again.

As appreciated from FIG. 7, the output sides of the right-side ajar warning control circuit 204 and the left-side door ajar warning control circuit 205 are connected with the base electrode of the switching transistor 2085 to maintain the switching transistor 2085 in an off position whenever either one of the door ajar warning control circuits 204 and 205 outputs the output. Also, the output side of the park brake warning control circuit 207 is connected to the base electrode of the switching transistor 2085' to keep the latter in an off position, when the park brake warning control circuit 207 has an output.

If one of the check points is in an abnormal or undesirable condition, one of the switching transistors 2022, 2032, 2042, 2052, 2072 or 2085 is turned on. In this condition, if the switch member 664 comes into contact with one of the stationary terminals 668 to 673 which is connected to the turned on transistor, the motor is supplied with power through a power transistor 2102. In response to starting of motor drive, a switching transistor 2104 turns on to a activate a relay circuit 2106 to reproduction circuit from a radio receiver to a voice warning device. Therefore, the speaker 2108 of the radio receiver is commonly used for voice warning and broadcast reproduction.

At the same time, a switching transistor 2110 is turned on to activate the actuator 659 in response to connecting the contact 664 to the switching transistor 2022, 2032, 2042, 2052, 2072 or 2085 being turned on. Thus, the record player starts reproduction of the recorded warning message corresponding to the check point.

In the shown circuit, a photo diode 2112 and a photo transistor 2114 constitute the foregoing record end detector. The photo transistor 2114 is turned on when the light transmitted from the photo diode 2112 is interrupted to turn off a switching transistor 2116. In response to turning off of the switching transistor 2116, the transistor 2110 is turned off to deactivate the actuator 659. Therefore, by repeating the transistor 2116 turning on and off, the warning message can be repeated.

The mechanical operation of the record player 6 is as illustrated with reference to FIGS. 2 to 6. The warning picked up by the pickup 603 of the tone arm 604 is fed to an amplifier 675 in the known vehicle radio circuit. The warning is outputted through a speaker of the vehicle radio.

As illustrated hereabove, the present invention fulfills all of the objects and advantages sought thereto.

While the specific construction is disclosed hereabove for illustration of the present invention, it will be possible to make various modifications to various features or elements consisting of the present invention. Therefore, the present invention should not be limited to the specific embodiment of the present invention and should be understood to include any modifications without departing from the principle of the present invention.

What is claimed is:

1. A voice warning device for an automotive vehicle comprising:
   detecting means for checking various check points in the vehicle to detect abnormal conditions of said check points, said detecting means producing a first signal when it detects an abnormal condition of one of said check points;

a record disc containing a plurality of voice warning messages corresponding to respective said check points on respective disc tracks;

a record player including a pickup for picking up the recorded warning message from said tracks, an actuation means for turning the record disc and positioning the pickup onto one of said tracks in response to said first signal and an initializing means for returning the pickup to the initial position thereof in which said pickup is located at the starting point for each of said tracks and away from the record disc;

a switch member responsive to said first signal for activating said actuation means to drive said record player to reproduce the warning message identified by said first signal;

stop means for stopping record player operation after expiration of a predetermined duration of reproduction of the warning message; and resetting means for resetting said stopping means for controlling the record player to reproduce the warning message which was most recently reproduced.

2. A voice warning device for an automotive vehicle comprising:

detecting means for checking a plurality of check points in the automotive vehicle and producing first signals respectively indicative of an abnormal condition of the check points when the abnormal condition is detected;

a record disc containing a plurality of prerecorded warning messages respectively corresponding to the check points to which, during abnormal conditions, warnings are to be generated, said record disc having a plurality of tracks respectively containing said warning messages, said tracks being arranged in helical fashion to align the starting points of respective tracks radially around the disc;

a record player including a pickup for tracking one of said tracks to pick up the recorded warning message, an actuation means for driving said record disc and placing said pickup at the initial point of one of said tracks and a circuit for reproducing an audible warning message according to electric signals inputted from the pickup;

a switch member responsive to one of said first signals to activate said actuation means for driving said record player, said switch member including a plurality of stationary terminals respectively located corresponding to the initial position of corresponding tracks of the record disc and a movable contact normally urged toward said stationary terminals and sliding thereacross, said movable contact moving across said stationary terminals in synchronism with the rotation of said record disc;

stopping means for stopping reproduction of the warning message after expiration of a predetermined time duration; and resetting means for resetting the stopping means to activate said record player to repeat the most recently reproduced warning.

3. A voice warning device for an automotive vehicle comprising:

a plurality of detecting means for detecting an abnormal condition of check points in the automotive vehicle and producing first signals when said detecting means detect abnormal conditions of the check points, said first signals identifying respectively corresponding warning items representative of the check points for which abnormal conditions are detected;

a record disc having a plurality of tracks arranged thereon in helical fashion, each of said tracks containing one of said warning messages corresponding to the warning items identified by said first signals, said tracks having starting points aligned radially around said disc;

a record player having means for reproducing an audible warning message in response to said first signal;

a record player circuit for driving said record player and for converting the electric signal, picked up from one of said tracks in response to one of said first signals, to an audible signal;

a plurality of stationary terminals located opposite said record disc and respectively positioned so as to correspond to the starting point of the corresponding track;

a movable terminal adapted for rotation with said record disc and sliding across said stationary contacts for scanning for the presence of said first signal identifying one of said warning items;

a timer circuit incorporated in said record player circuit and measuring the time duration of reproduction of the warning message, said timer circuit deactivating said record player circuit after expiration of a predetermined time duration;

a repeat switch manually operable for repeating the immediately-preceding warning message, said repeat switch being connected to said timer circuit for resetting the latter in order to activate said record player circuit again to repeat the immediately preceding warning message, said repeat switch activating said timer circuit after once reset for measurement of the time duration of reproducing of the warning message.

4. A voice warning device for an automotive vehicle comprising:

a plurality of detecting means for detecting abnormal conditions of a plurality of check points in the automotive vehicle and producing signals when an abnormal condition is detected, said detecting means including a plurality of of detectors for detecting conditions of checking factors and producing detector signals, and means for determining whether the combination of check point conditions is suitable for effecting warning based on the detector signals inputted thereto, said determining means having means for assigning priority to each of the check points for effecting warning according to the predetermined order;

a record disc for containing prerecorded warning messages respectively corresponding to abnormal conditions of the respective check points, said record disc having a plurality of record grooves arranged in helical fashion so that the starting points of the warning messages are arranged radially about the record disc;

a record player having a pickup normally placed in an initial position opposite the starting points of the warning messages but not in contact therewith, a turntable on which the record disc is mounted, an actuator for driving the turntable to rotate said record disc and putting said pickup onto one of said record grooves;

a record player circuit for converting an electric signal picked up from the record groove along which said pickup travels into an audible warning message and reproducing the same;

a movable contact attached to said turntable for rotation therewith;

a plurality of stationary contacts arranged opposite said movable contact and corresponding to said starting points of respective warning messages, said stationary contacts receiving said signals of the detecting means respectively indicative of the abnormal condition of the corresponding check point, said stationary terminals being located so that when the signal from the corresponding detecting means is inputted and said movable contact comes into contact therewith, said actuator becomes operative to put the pickup onto the record groove on which the warning message corresponding to the warning message identified by the inputted signal is recorded;

a timer circuit for measuring the duration of reproduction of the warning message and deactivating said actuator when the measured time is more than a predetermined value which is adapted to repeat the warning message a predetermined number of times, said timer circuit maintaining said actuator in deactivated position until it is reset; and a repeat circuit including a manually operable repeat switch and a repeat circuit connected with said timer circuit, said repeat circuit producing a command for resetting said timer circuit in response to turning on said repeat switch, said repeat circuit also associated with said record player circuit to activate the latter to repeat the most recently reproduced warning message for the check point.

5. A voice warning device for an automotive vehicle for producing voice warning messages for abnormal or undesirable conditions of vehicle devices and equipment, comprising:

first means for checking preselected check items of the vehicle devices and/or equipment to detect abnormal or undesirable conditions thereof, said first means producing a first signal indicative of an abnormal undesirable condition of the vehicle devices or equipment and identifying the vehicle devices or equipment having the abnormal or undesirable condition;

signal selector means associated with said first means for selectively passing said first signals according to a given priority for each check item;

second means for reproducing a plurality of warning voice messages, said second means including a record disc for storing the pre-recorded warning voice messages respectively corresponding to respective check items to be checked by said first means, a record player for reproducing said pre-recorded warning voice messages corresponding to the check items identified by said first signal which is fed from said first means through said signal selector means;

third means, including a manually operative repeat switch, for producing a second signal for operating said second means to repeat an immediately-preceding warning voice message when said repeat switch is operated; and fourth means, associated with said third means, for controlling said second means to operate to reproduce the immediately-preceding warning voice message in response to said second signal.

6. A voice warning device for an automotive vehicle for producing warning voice messages for abnormal or undesirable operational conditions of the vehicle devices and/or equipment comprising:

first means for checking preselected check items of the vehicle devices and/or equipment in operation to detect an abnormal or undesirable operational condition thereof, said first means producing a first signal representative of each check item having an abnormal or undesirable operational condition;

second means for reproducing a plurality of warning voice messages corresponding to respective check items, said second means including a record disc having a plurality of record tracks respectively recording said warning voice messages, a record player for reproducing selected warning voice messages corresponding to the check items identified by said first signal;

a voice selector associated with said first means to receive said first signal to detect the check item identified by said first signal to activate said second means to reproduce the corresponding warning voice message;

third means, including a manually operative repeat switch, for producing a second signal for repeating the immediately-preceding warning voice message; and fourth means, associated with said third means and said voice selector, for activating said voice selector in response to said second signal to select the immediately-preceding warning voice message to repeat the warning.

7. A voice warning device for an automotive vehicle for producing warning voice messages for abnormal conditions or undesirable operations of the vehicle devices and/or equipment, comprising:

first means for checking respective preselected check items for detecting abnormal conditions and/or undesirable operations of the vehicle devices and/or equipment, said first means producing various values of first signals respectively representative of the checked items being in an abnormal or undesirable condition;

second means for reproducing a plurality of pre-recorded warning voice messages, said second means including a record disc having a plurality of record tracks in which respective warning voice messages are recorded, and a record player for reproducing the warning voice message recorded in said record track;

control means, associated with said second means for controlling the operation of said second means, said control means being responsive to first signal from said first means to actuate said second means for reproducing one of said warning voice messages according to the check item identified by said first signal value;

third means, associated with said second means and including a manually operative repeat switch, for producing a second signal as said repeat switch is operated; and fourth means, associated with said third means, for operating said control means in response to said second signal for repeatedly producing the immediately-preceding warning voice message.

8. A device as set forth in claim 5, 6 or 7, wherein said record player in the second means comprises a pickup for picking up the prerecorded voice warning message, an actuation means for putting the pickup onto the record disc at the location corresponding to the identified voice warning message and for driving a turntable on which said record disc is mounted, said actuation means being responsive to said first signal to become operative.

9. A device as set forth in claim 8, wherein said record player includes a switching means responsive to said first signal for operating the record player and for driving said actuation means.

10. A device as set forth in claim 5, 6 or 7, which further comprises a timer means for measuring a duration of reproduction of the warning voice message and rendering said second means inoperative when a predetermined duration expires.

11. A device as set forth in claim 10, wherein said predetermined duration in said timer means is determined in dependence on a length of said record tracks.

12. A device as set forth in claim 11, wherein said device is adapted to warn that a vehicle door is ajar when the vehicle is driven, that the ignition key is in the key cylinder when the driver leaves the vehicle, that the lighting switch is left on when the ignition switch is turned off, and that the parking brake is in the applied condition when the vehicle is driven.

* * * * *